United States Patent

Yamada et al.

[11] Patent Number: 5,846,371
[45] Date of Patent: Dec. 8, 1998

[54] THERMALLY INSULATED CONTAINER AND PRODUCTION PROCESS THEREFOR

[75] Inventors: Masashi Yamada; Yasuhiko Komiya; Atsuhiko Tanaka; Seiichi Ito, all of Tokyo, Japan

[73] Assignee: Nippon Sanso Corporation, Tokyo, Japan

[21] Appl. No.: 843,759

[22] Filed: Apr. 21, 1997

Related U.S. Application Data

[62] Division of Ser. No. 565,807, Nov. 30, 1995, Pat. No. 5,678,725.

[30] Foreign Application Priority Data

Dec. 20, 1994 [JP] Japan .................................. 6-317321

[51] Int. Cl.⁶ ........................ B32B 11/00; B65B 31/04
[52] U.S. Cl. ................................ 156/286; 141/4
[58] Field of Search ................... 156/292, 285; 141/4

[56] References Cited

U.S. PATENT DOCUMENTS

| | | | |
|---|---|---|---|
| 844,272 | 2/1907 | Fate | 220/425 |
| 999,672 | 8/1911 | Puffer | 220/425 |
| 1,165,952 | 12/1915 | Dunlap | 220/425 |
| 3,110,157 | 11/1963 | Radd | 220/425 |
| 3,425,582 | 2/1969 | Numlist et al. | 220/426 |
| 4,459,793 | 7/1984 | Zengler | 220/426 |
| 4,937,628 | 6/1990 | Cipolla et al. | 141/364 X |
| 5,080,146 | 1/1992 | Arasteh | 141/4 |

*Primary Examiner*—Francis J. Lorin
*Attorney, Agent, or Firm*—Darby & Darby

[57] ABSTRACT

A thermally insulated container of the present invention is a double-walled container in an integral body in which an inner casing is arranged in an outer casing so as to maintain a space therebetween, wherein the space is charged with a gas having a low thermal conductivity, and an opening having a diameter of 0.1 to 3 mm for charging gas in a wall of either of the inner casing and the outer casing is sealed. In a production process of the present invention, a double-walled container is obtained by arranging an inner casing in an outer casing so as to maintain a space therebetween, and by joining them into an integral body, a wall of either of the inner casing and the outer casing being provided with an opening for charging gas; then, the double-walled container is placed in a thermostatic chamber, a charging-evacuating tube which is switchably disposed to a vacuum evacuation apparatus and to a source of a gas having a low thermal conductivity is connected to the opening for charging gas, the space between the walls of the inner and outer casings is subjected to vacuum evacuation at a predetermined temperature, and thereafter a gas having a low thermal conductivity is introduced; and then, the opening for charging gas is sealed.

12 Claims, 4 Drawing Sheets

5,846,371

THERMALLY INSULATED CONTAINER AND PRODUCTION PROCESS THEREFOR

This is a division of application Ser. No. 08/565,807, filed Nov. 30, 1995 now U.S. Pat. No. 5,678 725.

BACKGROUND OF THE INVENTION

The present invention relates to a production process for thermally insulated containers to be used as thermos bottles, cooler boxes, thermally insulated cups, heat retaining lunch boxes, or the like; and specifically, the present invention relates to a thermally insulated container in which a space formed between an inner casing and an outer casing of a double-walled container, in which the inner casing and the outer casing are joined at each mouth portion, is charged with a gas having a low thermal conductivity, and to a production process therefor.

Conventionally, as these types of thermally insulated containers, there may be mentioned a thermally insulated container which is a double-walled container made of synthetic resin in an integral body in which an inner casing is arranged in an outer casing so as to maintain a space therebetween, wherein the aforementioned space is charged with an organic foam, such as a rigid urethane foam or a polystyrene foam, or a molded body thereof, or is charged with an inorganic particulate such as perlite.

In addition, a thermally insulated vacuum container made of metal which is a double-walled container in which an inner casing and an outer casing which are made of metal are formed into an integral body, which is obtained by subjecting the outer surface of the inner casing and the inner surface of the outer casing to plating or vacuum deposition; evacuating the space formed between the inner casing and the outer casing to form a vacuum, and sealing the space to maintain the vacuum; has been proposed.

Furthermore, Japanese Utility Model Application, First Publication, Sho 62-85267, discloses a thermally insulated double-walled container obtained by replacing a space formed between an inner casing and an outer casing, which are made of synthetic resin, with an inert gas or the like, and thereafter sealing by joining a mouth portion of the inner casing and a mouth potion of the outer casing by ultrasonic welding or with an adhesive agent.

However, there are disadvantages with the thermally insulated container charged with the above foam or the like in that since the thermal conductivity of the charged material such as the foam is high, the thermally insulating space layer should be thick in order to enhance thermal insulation performance of the thermally insulated container, and therefore the thermally insulated container becomes heavy, and the ratio of the inside volume with respect to the outside volume, i.e., the effective-volume ratio, deteriorates.

In addition, the thermally insulated vacuum container made of metal has superior thermal insulation performance as well as it has a good effective-volume ratio since the thickness of the thermal insulation space layer can be small; however, there are problems in that the production process therefor is complicated and expensive.

Moreover, with regard to the thermally insulated double-walled container in which the space between the inner casing and the outer casing is replaced with an inert gas as disclosed in Japanese Utility Model Application, first Publication, Sho 62-85267, air existing between the inner casing and the outer casing is replaced with an inert gas such as helium, argon, nitrogen gas, or carbonic acid gas; however, helium and nitrogen gas do not serve as thermally insulating gases since they have a thermal conductivity higher than that of air. In addition, since the inner casing and the outer casing are sealed at their mouth portions, even the sealing of the mouth portions by bonding by means of ultrasonic welding or with an adhesive agent would require the length of the sealed portion to be great and thus, there are problems in that the probability of leakage of the gas becomes high, and also in that the reliability of the sealed portion is inferior.

Furthermore, in the case of a thermally insulated double-walled container in which an inner casing and an outer casing are joined at their mouth portions, and which is obtained by joining a tip tube to the outer casing in advance, replacing the space formed between the inner casing and the outer casing with an inert gas via said tip tube, and sealing said tip tube, a protective cover for the tip tube is necessary in addition to the outer casing in order to protect the tip tube from damage to the tip tube if it falls or the like. Therefore, there are disadvantages in that high cost is required as well as in that the efective-volume ratio deteriorates.

DISCLOSURE OF THE INVENTION

The object of the present invention is to provide a thermally insulated container, and a production process therefor, which has excellent thermal insulation performance as well as a light weight, a high reliability of the sealed portion, and a high effective-volume ratio, and which can be simply produced and is inexpensive.

A thermally insulated container of the present invention is a double-walled container in an integral body in which an inner casing is arranged in an outer casing so as to maintain a space therebetween, wherein said space is charged with a gas having a low thermal conductivity, and a wall of either of said inner casing and said outer casing is provided with a sealed portion which is obtained by sealing an opening having a diameter of 0.1 to 3 mm for charging gas.

In this thermally insulated container, the sealed portion may be obtained by sealing the opening for charging gas with an adhesive agent.

The sealed portion may be obtained by joining a sealing plate to the opening for charging gas with an adhesive agent.

It is preferable that the above-mentioned adhesive agent be a cyanoacrylic adhesive agent.

In the thermally insulated container according to the present invention, the gas having a low thermal conductivity may be at least one gas selected from the group consisting of xenon, krypton, and argon.

In the thermally insulated container according to the present invention, at least the outer casing, among the inner casing and the outer casing, is made of a synthetic resin material.

A production process of a thermally insulated container according to the present invention is characterized by:

preparing a double-walled container by arranging an inner casing in an outer casing so as to maintain a space therebetween, and by joining them into an integral body, a wall of either of the inner casing and the outer casing being provided with an opening for charging gas; then, placing the double-walled container in a thermostatic chamber, connecting to said opening for charging gas a charging-evacuating tube which is switchably disposed to a vacuum evacuation apparatus and to a source of a gas having a low thermal conductivity, subjecting said space between the walls of the inner and outer casings to vacuum evacuation at a predetermined temperature, and thereafter introducing a gas having a low thermal conductivity; and then, sealing said opening for charging gas.

In this process, the diameter of the opening for charging gas may be 0.1 to 3 mm.

In this process, the pressure in the space to be reached during the vacuum evacuation may be 10 Torr or less.

In this process, the introduction pressure of the gas having a low thermal conductivity into the space may be approximately atmospheric pressure.

In this process, the gas having a low thermal conductivity may be at least one gas selected from the group consisting of xenon, krypton, and argon.

In this process, the sealing of the opening for charging gas may be carried out using an adhesive agent.

In this process, the sealing of the opening for charging gas may be carried out by bonding a sealing plate with an adhesive agent.

In this process, as the adhesive agent, a cyanoacrylic adhesive agent may be used.

In this process, at least the outer casing, among the inner casing and the outer casing, may be of a synthetic resin material.

Since the thermally insulated container of the present invention is a double-walled container in an integral body in which an inner casing is arranged in an outer casing so as to maintain a space therebetween, wherein said space is charged with a gas having a low thermal conductivity, and a wall of either of said inner casing and said outer casing is provided with a sealed portion which is obtained by sealing an opening having a diameter of 0.1 to 3 mm for charging gas, and the opening of the sealed portion is small, the probability of leakage of the gas from the sealed portion is low, and the reliability of the sealed portion is increased. Furthermore, since the space in the double-walled container is charged with the gas having a low thermal conductivity, thermal insulation performance is improved.

In addition, by sealing the aforementioned opening for charging gas, which has the diameter of 0.1 to 3 mm, with an adhesive agent, the sealing procedure is simplified, and it is possible to securely seal in the gas having a low thermal conductivity. Alternatively, by sealing the opening for charging gas with an adhesive agent and bonding to the top thereof a sealing plate with the adhesive agent, the opening for charging gas is sealed with the adhesive agent, and in addition, the sealed portion can be protected by the sealing plate.

Moreover, since a cyanoacrylic adhesive agent to be used for the sealing of this thermally insulated container possesses instantaneous adhesive strength, it becomes possible to seal the opening for charging gas in a short time. In addition, a conventional sealing of a thermally insulated container made of metal, the apparatus for which is complicated and large, since sealing is carried out by joining a sealing plate by means of brazing, or sealing is carried out by compressing a tip tube made of copper; in contrast, since the sealing by means of the cyanoacrylic adhesive agent requires merely an apparatus for supplying this adhesive agent, such as an injector, and thus the apparatus for sealing can be simplified, the cost for sealing can be reduced, and the sealing can be easily carried out.

Moreover, the gas having a low thermal conductivity, which may be at least one gas selected from the group consisting of xenon, krypton, and argon, each of which has a thermal conductivity lower than that of air, can provide a thermally insulated container with excellent thermal insulation performance. In addition, these gases, which are inert, can be safely handled during production of the thermally insulated container and during use in the thermally insulated container.

Furthermore, by making at least the outer casing, among the inner casing and the outer casing, of a synthetic resin material, the thermally insulated container can be light, and in addition, freedom of selecting the design and the color for the thermally insulated container is extended, and such a thermally insulated container is inexpensive.

In addition, according to the production process of thermally insulated container of the present invention, the production steps can be simplified as follows:

preparing a double-walled container by arranging an inner casing in an outer casing so as to maintain a space therebetween, and by joining them into an integral body, a wall of either of the inner casing and the outer casing being provided with an opening for charging gas; then, placing the double-walled container in a thermostatic chamber, connecting to said opening for charging gas a charging-evacuating tube which is switchably disposed to a vacuum evacuation apparatus and to a source of a gas having a low thermal conductivity, subjecting said space between the inner casing and the outer casing to vacuum evacuation at a predetermined temperature, and thereafter introducing a gas having a low thermal conductivity; and then, sealing said opening for charging gas.

A thermally insulated container having excellent thermal insulation performance can be thereby obtained at low cost.

Moreover, by forming the opening for charging gas with a diameter as small as 0.1 to 3 mm, the opening for charging gas can be securely sealed with an adhesive agent, and there is little probability of leakage of the gas through this sealed portion after this opening is sealed.

In addition, by setting the vacuum evacuation pressure of the space at 10 Torr or less, air remaining in this space after the vacuum evacuation is hardly influential.

Moreover, by setting the introduction pressure of the gas having a low thermal conductivity into the aforementioned space at approximately atmospheric pressure, after charging the gas having a low thermal conductivity with the space of the double-walled container sealing the opening for charging gas, inward deformation or swelling of the walls of the inner and outer casings, due to the difference in pressure between the aforementioned space and outside air resulted from the difference in temperature between the outside temperature and the temperature of the contents when the container is used as a thermally insulated container, can be reduced.

Furthermore, by sealing the opening for charging gas with an adhesive agent, the sealing of the opening for charging gas is extremely easy, and in addition, the surface of the sealed portion can be flattened even after sealing, which makes it possible to enhance the effective-volume ratio of tho thermally insulated container. In addition, by carrying out the sealing of the opening for charging gas by bonding a sealing plate with an adhesive agent, this scaled portion can be protected by the sealing plate after the opening for charging gas is sealed with the adhesive agent, and the reliability of the sealed portion increases.

DETAILED DESCRIPTION

Figure 1:
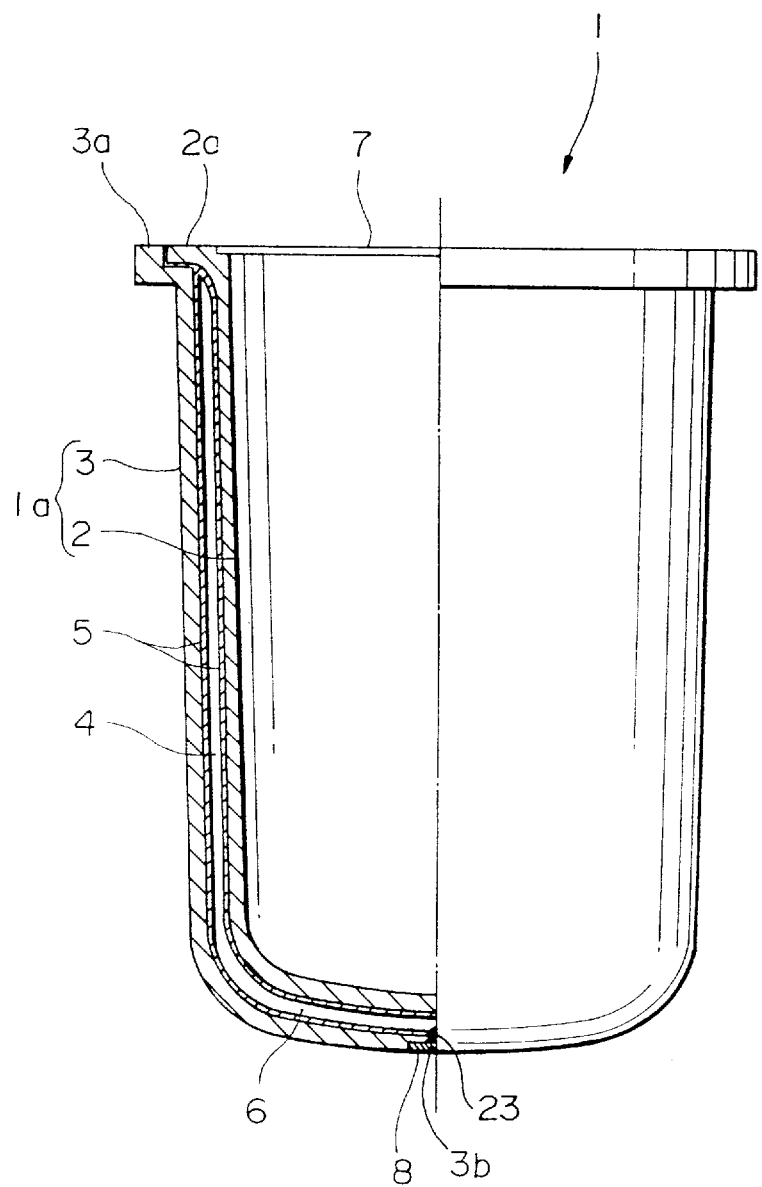
FIG. 1 is a partially cross-sectional front view showing the first embodiment of a thermally insulated container of the present invention.

FIG. 1 shows the first embodiment of a thermally insulated container of the present invention. This thermally insulated container 1 is constructed by: forming a double-walled container 1a by joining an inner casing 2 and an outer casing 3, which are made of any of a metal material, such as stainless steel, a glass, a ceramic, and a synthetic resin material having high gas-barrier property, at each of their flange portions 2a and 3a, respectively, so as to maintain a space 4 between the casings; forming metal coatings 5 and 5 on the surfaces facing each other of the inner casing 2 and the outer casing 3; forming a thermal insulation layer 6 by charging the space 4 between the metal coatings 5 and 5 with at least one gas having a low thermal conductivity which is selected from the group consisting of xenon, krypton, and argon; sealing an opening 3b for charging gas, which is provided in the bottom portion of the outer casing 3, with an adhesive agent 23; and bonding a sealing plate 8 to the bottom part of this opening 3b for charging gas.

The opening 3b for charging gas, which is provided in the bottom portion of the aforementioned outer casing 3, is so formed that the diameter thereof is 0.1 to 3 mm. If this diameter is smaller than 0.1 mm, increased resistance during charging the gas having a low thermal conductivity requires a substantial amount of time for charging the gas. On the other hand, if the diameter is larger than 3 mm, when sealing the opening 3b for charging gas with an adhesive agent, the possibility of incomplete sealing arises since the adhesive agent drips from this opening 3b for charging gas, and the reliability of sealing is diminished.

Even in the case where the opening 3b for charging gas is sealed merely with the adhesive agent, the inert gas with which the space 4 of the thermally insulated container is charged will not leak, and thermal insulation performance can be retained. Accordingly, a thermally insulated container 1, for which the step of sealing is extremely simple, and which is inexpensive, can be provided.

In addition, sealing of the opening 3b for charging gas may be carried out by bonding the sealing plate 8 with the adhesive agent. When this is the case, the double-walled container 1a is placed upside down so that the opening 3b for charging gas faces upward, an adhesive agent is supplied to the periphery surrounding the opening 3b for charging gas, and thereafter a sealing plate 8 is bonded to the top portion of the opening 3b for charging gas; therefore, the opening 3b for charging gas is sealed, and at the same time, the opening 3b for charging gas can be protected, and thus the reliability of the opening 3b for charging gas can be improved. It is preferable that the material for this sealing plate 8 be the same as that for the inner casing 2 and outer casing 3; however, a different material, for example, a sealing plate 8 of a synthetic resin material with an outer casing 3 made of a metal material, may be used, and any one of a metal material, a glass, a ceramic, a synthetic resin having high gas-barrier property can be bonded with an adhesive agent and can protect the opening 3b for charging gas.

A cyanoacrylic adhesive agent is used as the aforementioned adhesive agent. Such an adhesive agent has a high gas-tightness as well as instantaneously providing a great adhesive strength, and provides a great operational efficiency since it can securely and instantaneously seal the opening 3b for charging gas. Therefore, even in the case when a sealing plate of a different material is used, it can be bonded securely, and it can protect the opening 3b for charging gas.

The gas with which the aforementioned space 4 is charged is xenon ($\kappa = 0.52 \times 10^{-2}$ W m$^{-1}$; K$^{-1}$; 0° C.), krypton ($\kappa = 0.87 \times 10^{-2}$ W m$^{-1}$ K$^{-1}$; 0° C.), or argon ($\kappa = 1.63 \times 10^{-2}$ W m$^{-1}$ K$^{-1}$; 0° C.), each of which has a thermal conductivity $\kappa$ lower than that of air ($\kappa = 2.41 \times 10^{-2}$ W m$^{-1}$ K$^{-1}$; 0° C.); one of these gases may be used alone, or in a mixed gas of two or more gases. Since these gases have a low thermal conductivity, a thermally insulated container 1 having high thermal insulation performance can be provided. In addition, since these gases are inert, the use thereof does not cause any problem in preservation of the environment, and thus they are suited for use.

It is preferable that at least the outer casing 3, among the aforementioned inner casing 2 and outer casing 3, is formed of a synthetic resin material, since, in comparison with a metal material, a glass, and a ceramic, a synthetic resin material can be molded into an arbitrary shape, and the color thereof can be selected freely. In addition, in the case when a synthetic resin material is also used for the inner casing 2, the inner casing 2 can be made with an appearance similar to that of the outer casing 3, and thus the effective-volume ratio can be enhanced. Furthermore, since such an inner casing 2 and an outer casing 3 can be produced inexpensively, an inexpensive thermally insulated container 1 can be provided.

Figure 2:
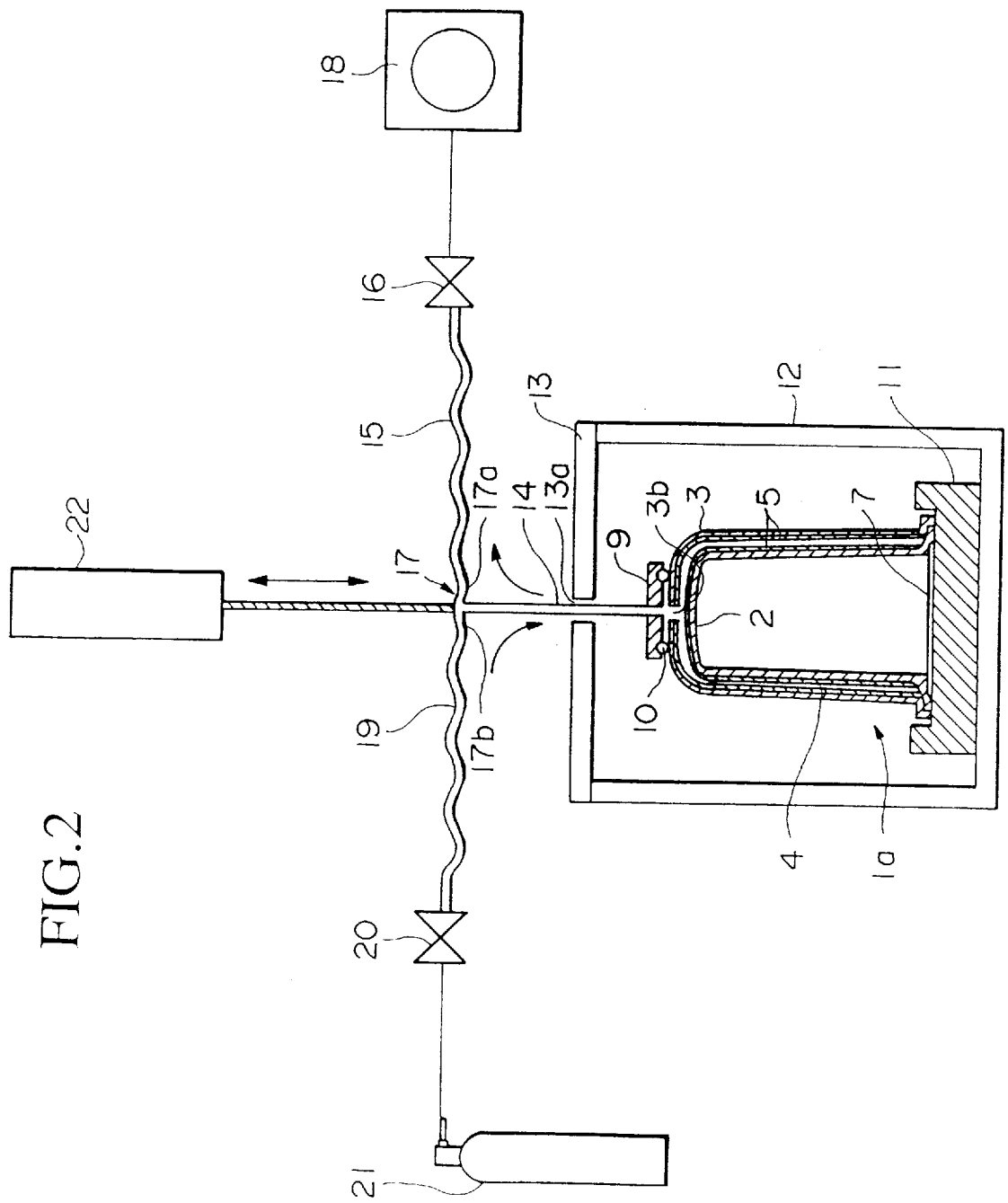
FIG. 2 is a schematic structural view illustrating a production apparatus suitable for producing the same thermally insulated container as the above.

FIG. 2 illustrates a production apparatus which is suitable for producing the aforementioned thermally insulated container 1. This apparatus comprises: a mounting block 11 on which a double-walled container 1a is mounted in a state such that the opening 7 thereof faces downward; a thermostatic chamber 12 to maintain a constant temperature, which surrounds the double-walled container 1a which is mounted upside down on the mounting block 11; a lid 13 which is fitted to this thermostatic chamber 12 in an openable and closable manner; a charging-evacuating tube 14 for evacuating the space in the aforementioned double-walled container 1a into a vacuum, and for charging the aforementioned gas having a low thermal conductivity; and a bell jar 9 which is connected to the tip of the charging-evacuating tube 14. On the bottom surface of this bell jar 9, a packing is provided for gas-tightly maintaining charging-evacuating paths, such as the space 4 and the charging-evacuating tube 14, via the opening 3b, for charging gas, of the double-walled container. with the aforementioned charging-evacuating tube 14, an evacuation tube 15 and a charging tube 19 are gas-tightly communicated via a connecting portion 17. To this evacuation tube 15, a vacuum pump 18 is connected via an evacuation valve; and to the charging tube 19, a cylinder 21 containing a gas having a low thermal conductivity is connected via a charging valve 20. In addition, a driving shaft of an air cylinder 22 to drive the connecting portion 17 up and down is connected to the connecting portion 17.

The aforementioned thermostatic chamber 12 is provided with a heating means, such as an electrothermal heater and an infrared ray lamp, so as to be able to maintain the double-walled container 1a, which is mounted in this thermostatic chamber 12, at a predetermined temperature. The lid 13 provided at the upper end of this thermostatic chamber 12 is made of two lid members which are obtained by cutting a lid having a size sufficient to cover the upper end opening of the thermostatic chamber 12 into halves which are linearly symmetric, and thus the lid 13 is openable from the line of symmetry toward right and left directions and is closable, so that the structure of the lid 13 allows the double-walled container to be taken in and out. In addition, in a middle portion of the lid 13, a through hole 13a having a diameter slightly larger than the tube diameter of the charging-evacuating tube 14 so that the aforementioned charging-evacuating tube 14 can move up and down.

By using this apparatus, the aforementioned thermally insulated container 1 is produced by: firstly, preparing an inner casing 2 in the shape of a bottomed cylinder from any material selected from a metal material, such as stainless steel, a glass, a ceramic, and a synthetic resin material having high gas-barrier property, and preparing an outer casing 3, preferably from the same material, in which an opening for charging gas having the diameter of 0.1 to 3 mm is provided in the bottom portion; and then forming a metal coating having the thickness of approximately 10 $\mu$m on each of the outer surface of the inner casing 2 and the inner surface of the outer casing 3 by copper plating or the like. Accordingly, in the case when a synthetic resin material is used in an thermally insulated container 1, a gas-barrier property is provided, and transmission of heat by radiation is prevented. Therefore, the thicknesses of the inner casing 2 and the outer casing 3 can be reduced, and thus a light thermally insulated container 1 can be produced at a low production cost. In addition, in the case when a metal material, such as stainless steel, a glass, a ceramic, or the like is used instead of a synthetic resin material, transmission of heat by radiation is prevented, and especially when a metal material is used, the thicknesses of the inner casing 2 and the outer casing 3 can be reduced, and furthermore, it is possible to narrow the space 4; thus, a thermally insulated container having a high effective-volume ratio can be produced. Then, the inner casing 2 and the outer casing 4 are joined into an integrated body at each of flange portions 2a and 3a to form a double-walled container 1a. This joining may be carried out according to a method suitably selected from welding, soldering, bonding, vibration welding, and spin welding, corresponding to materials used in the casings.

The thickness of the space between the inner casing 2 and the outer casing 3 in the double-walled container 1a is preferably arranged within a range between 1 and 10 mm. In the case when the thermally insulated container 1 is formed with this thickness of the space larger than 10 mm, convection of the gas having a low thermal conductivity, with which the aforementioned space 4 is charged, causes the amount of heat transfer to become large, causes the total amount of heat transfer in the direction of the thickness of the space 4 to become so large that the thermal insulation efficiency deteriorates, and necessitates a larger thickness of the space 4 so that the effective-volume ratio deteriorates. on the other hand, in the case when the thickness of the space is smaller than 1 mm, it becomes difficult to form the double-walled container 1a while avoiding contact between the inner casing 2 and the outer casing 3, much time is required for the production, and the production cost is caused to increase.

Next, the lid 13 of the thermostatic chamber 12 is opened, and the aforementioned double-walled container 1a is mounted on the mounting block 11 in a manner such that the mouth portion 7 faces downward. This mounting block 11 is disposed at the bottom portion of the aforementioned thermostatic chamber 12, and it has a shape such that positioning can be carried out in which the center of the opening 3b for charging gas which is provided in the bottom surface of the outer casing 3 always meets a predetermined position. The opening 3b for charging gas is so formed that the diameter thereof is 0.1 to 3 mm, as described above.

The aforementioned thermostatic chamber 12 is heated to a predetermined temperature in advance by means of a heating means, such as a heater, which is not shown in the drawings. Since the range of temperatures to which the inner casing 2 and the outer casing 3 are expected to be exposed when they are used in the thermally insulated container 1 is approximately from $-20°$ to $+90°$ C., it is preferable that the heating temperature be arranged at the approximately middle of this temperature range, i.e., at $30°$ to $40°$ C.

In order to charge the gas having a low thermal conductivity with the space 4 of the double-walled container 1a, firstly, the air cylinder 22 is moved downward so that the packing 10 of the bell jar 9 is pushed against the bottom surface of the aforementioned double-walled container 1a. Accordingly, the packing 10 disposed on the bottom surface of the bell jar 9 is brought into strong contact with the bottom surface of the double-walled container 1a, and the space 4 of the double-walled container 1a and the charging-evacuating paths, such as the charging-evacuating tube 14, the evacuation tube 15, and the charging tube 19, are isolated from the outside air, and are maintained gas-tightly. In addition, since the double-walled container 1a is positioned in advance on the mounting block 11, the center of the bell jar 9 and the center of the opening 3b, for charging gas, of the double-walled container 1a are aligned approximately in the vertical direction.

Then, the charging valve 20 is closed, the evacuation valve 16 is opened, and the space 4 in the double-walled container 1a is evacuated into a vacuum until the pressure reaches 10 Torr or less by means of the vacuum pump 18. By making the degree of vacuum 10 Torr or less, influence from the remaining air can be ignored.

Next, the evacuation valve 16 is closed, thereafter the charging valve 20 is opened, and the space 4 of the double-walled container which is retained at approximately $30°$ to $40°$ C. is charged with a gas having a low thermal conductivity comprising one or more gases selected from xenon, krypton, and argon, from the gas cylinder 21 until the pressure in the space 4 reaches atmospheric pressure. After the gas having a low thermal conductivity is charged, the charging valve 20 is closed.

Since the double-walled container 1a is maintained at a predetermined temperature which is approximately $30°$ to $40°$ C., the gas, having a low thermal conductivity, with which the space 4 of the double-walled container 1a is charged, is heated until the temperature of the space 4 reaches approximately the same temperature as the predetermined temperature. Accordingly, after the opening 3b for charging gas is sealed and the gas having a low thermal conductivity is enclosed, the temperature of the gas having a low thermal conductivity can be arranged at approximately the average of the temperature range from $-20°$ to $+90°$ C., to which the inner casing 2 and the outer casing 3 are expected to be exposed, and thereby pressure changes of the gas having a low thermal conductivity due to the variation of the temperature can be reduced. Accordingly, even in the case when a double-walled container 1a which does not have a pressure-resistant structure is used, occurrence of inward deformation or swelling of the inner and outer casings is prevented or reduced. The duration of heating of the double-walled container 1a may be set by means of a timer.

When the temperature of the charged gas within the aforementioned space 4 reaches 30° to 40° C., the lid 13 of the thermostatic chamber 12 is opened, and the bell jar 9 is raised by driving the air cylinder 22. Since the space 4 is charged with the gas having a low thermal conductivity at atmospheric pressure, the bell jar 9 can be easily removed from the double-walled container 1a. It is preferable that the driving stroke of the air cylinder 22 is so arranged that the bell jar 9 is not obstructive when the double-walled container 1a is taken into and out of the thermostatic chamber 12; for example, the driving stroke is arranged corresponding to the height of the thermostatic chamber 12.

In addition, the driving of the air cylinder 22 is accompanied by an up-and-down movement of the aforementioned connecting portion 17, and by movements of the evacuation tube 15 and the charging tube 19, which are connected to the connecting portion 17. Therefore, it is desirable that for the evacuation tube 15 and the charging tube 19, a tube made of a gas-tight and flexible material be used, such as a rubber tube and a ribbed tube made of synthetic resin or metal. Moreover, it is desirable that the evacuation tube 15 and the charging tube 19 be used with a sufficient length so as not to obstruct the up-and-down movement of the connecting portion 17 accompanying the driving of the air cylinder 22.

Figure 3:
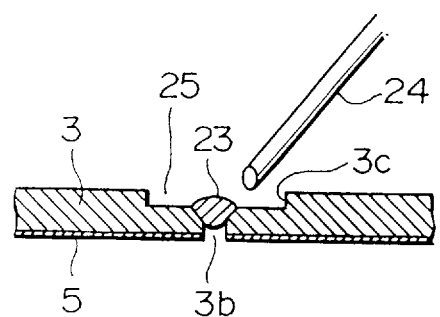
FIG. 3 is a cross-sectional view of a main portion showing a method of sealing in producing the same thermally insulated container as the above.

Next, as shown in FIG. 3, immediately after the bell jar 9 is raised from the double-walled container 1a, an adhesive agent 23 is injected to the opening 3b, for charging gas, of the double-walled container 1a from the tip of a dispenser 24, and a sealed portion 25 is formed by sealing the opening 3b for charging gas, to produce a thermally insulated container. By simply sealing the opening 3b, for charging gas, with the adhesive agent 23, the gas having a low thermal conductivity with which the space 4 is charged can be enclosed. Since xenon, krypton, and argon, which are gases having low thermal conductivities, have 4.53 times, 2.89 times, and 1.38 times larger specific gravities than that of air, respectively, the gas having a low thermal conductive is not replaced by air within the duration of a few seconds in which after the gas is charged, the bell jar is raised, and the adhesive agent is injected into the opening 3b for charging gas; therefore, problems with regard to thermal insulation performance do not arise.

Figure 4:
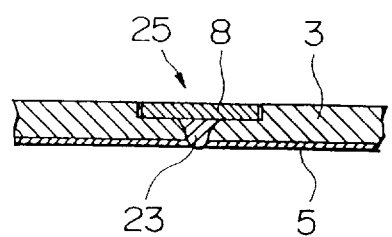
FIG. 4 is a cross-sectional view of a main portion showing another method of sealing.

FIG. 4 shows another method of sealing the sealing the opening 3b for charging gas. In this method of sealing, a sealed portion is formed by injecting an adhesive agent 23 into the opening 3b for charging gas, and thereafter, joining a sealing plate 8 over the opening 3b for charging gas. By joining a sealing plate 8 over the opening 3b for charging gas, the sealed portion 25 can be protected by the sealing plate 8, and the reliability of sealing can be enhanced. When this is the case, after the adhesive agent 23 is injected into the opening 3b for charging gas, the adhesive agent 23 is applied to a round recess 3c which is coaxial with the opening 3b for charging gas, and then the sealing plate 8 which is so shaped as to be housed in this round recess 3c is joined thereto. By providing the recess 3c in the periphery of the opening 3b for charging gas, and bonding the sealing plate 8 in the recess 3c accordingly, the adhesive agent 23 can be applied to a predetermined location, and the sealing plate 8 can be securely bonded without deviating.

As the adhesive agent 23 to be used for sealing the opening 3b for charging gas, a cyanoacrylic instantaneous adhesive agent can be used. Such an adhesive agent has a high gas-tightness, and can instantaneously seal the aforementioned opening 3b for charging gas. Furthermore, since such an adhesive agent possesses a strong adhesion, the sealing plate 8 can be strongly bonded within the aforementioned recess 3c, and the sealed portion 25 can be protected.

Since the thermally insulated container 1 can be obtained by sealing the opening 3b, for charging gas, of the double-walled container 1a, and instantaneously bonding the sealing plate 8 to form the sealed portion 25 accordingly, the thermally insulated container 1 can be taken out of the thermostatic chamber 12 immediately after the sealing process.

Then, by sequentially repeating the same steps as those described in the above, thermally insulated containers 1 can be produced successively.

In this case, by setting the surrounding temperature in a range between 20° to 30° C., the charging of the gas having a low thermal conductivity can be carried out without using a thermostatic chamber, and when this is the case, no problems arise with regard to the working environment. Accordingly, in the case when the gas charging is carried out without a thermostatic chamber, mass production is possible without difficulty.

Furthermore, by forming at least the outer casing 3, among the inner casing 2 and the outer casing 3, from a synthetic resin material, a thermally insulated container 1 can be provided having extended freedom of appearance and color, and such a thermally insulated container 1 can be light and inexpensive. In the case when the inner casing 2 and the outer casing 3 are formed using a synthetic resin material, the affinity between these casings is improved, it becomes easy to join, by means of bonding or welding, the flange portions 2a and 3a of the inner casing 2 and the outer casing 3, respectively, even after the metal coatings 5 and 5 are formed, and the productivity of the thermally insulated container 1 can be enhanced.

Figure 5:
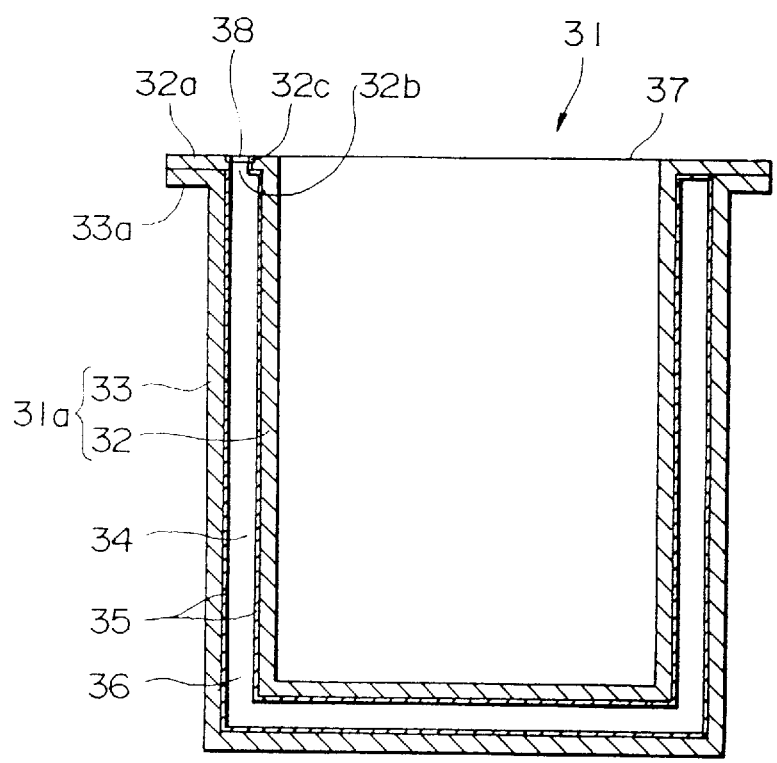
FIG. 5 is a front sectional view showing the second embodiment of a thermally insulated container of the present invention.

FIG. 5 shows the second embodiment of a thermally insulated container of the present invention, in which this thermally insulated container 31 is constructed by: forming a double-walled container 31a by joining an inner casing 32 and an outer casing 33, which are made of any of a metal material, such as stainless steel, a glass, a ceramic, and a synthetic resin material having high gas-barrier property, at each of their flange portions 32a and 33a, respectively, so as to maintain a space 34 between the casings; forming metal coatings 35 and 35 on the outer surface of the inner casing 32 and on the inner surface of the outer casing 33; forming a thermal insulation layer 36 by charging the space 34 between the metal coatings 35 and 35 with one or more gases having a low thermal conductivity which is selected from the group consisting of xenon, krypton, and argon; sealing an opening 32b for charging gas, which is provided in the flange portion 32a of a mouth portion 37 of the inner casing 32, with an adhesive agent; and bonding a sealing plate 38 to the top portion of this opening 32b.

In the same manner as in the above embodiment, this opening 32b for charging gas has a diameter from 0.1 to 3 mm, and in the upper portion of this opening 32b, there is a recess having a diameter extended to a size large enough to allow the sealing plate 38 to be inserted thereinto.

This thermally insulated container 31 can be produced by: providing the opening 32b, for charging gas, in the flange portion 32a; placing the inner casing 32, on the outer surface of which a metal coating is formed, into the outer casing 33, on the inner surface of which a metal coating is formed, so as to bring them together; joining each of the flange portions 32a and 33a by means of any of welding, soldering, bonding, vibration welding, and spin welding, so as to form a double-walled container 31a. Then, a thermally insulated container 31 is produced from the double-walled container 31a using a production apparatus, which is not shown in the drawings, comprising components similar to those of the production apparatus shown in FIG. 2, and in which positions and shapes of the mounting block 11, the lid 13 of the thermostatic chamber 12, the bell jar 9, and the like, are rearranged so as to be suitable for the production from the double-walled container 31a in which the opening 32b for charging gas is provided in the flange portion 32a of the inner casing 32.

Since the opening 32b, for charging gas, of the double-walled container 31a is deviated from the central axis of the inner and the outer casings, when the double-walled container 31a is mounted on a mounting block 11 for exclusive use, positioning is carried out in advance so as to bring the center of the opening 32b, for charging gas, to a constant position nearly corresponding to the central axis of the bell jar 9. In addition, the aforementioned through hole 13a in the lid 13 of the thermostatic chamber 12 is provided in a position in which the charging-evacuating tube 14 moves up and down. In this case, the lid 13 is not formed from half lids which are linearly symmetric as is the case with the first embodiment; however, the lid 13 is formed with asymmetric lid members so that the portion in which the lid members meet is situated approximately vertically above the center of the opening 32b, for charging gas, which has been positioned, and the through hole 13a is formed at this portion in which the lid members meet. In addition, in order to cope with the shortness of the flange portion 32a in the direction of the diameter, it is necessary that the bell jar 9 be in a small shape so that the vacuum evacuation and the charging of the gas having a low thermal conductivity can be carried out.

By using the production apparatus rearranged accordingly, the opening 32b, for charging gas, and the charging-evacuating tube 14 are connected by: placing the double-walled container 31a on the mounting block 11 in a state such that the mouth portion 37 faces upward, and that the opening 32b for charging gas Laces to a predetermined direction; moving the connecting portion 17 downward by driving the air cylinder 22; and bringing the packing 10 of the bell jar 9 into contact with the periphery of the opening 32b for charging gas. Then, vacuum evacuation of the space 34 of the double-walled container 31a through the charging-evacuating tube 14 is carried out to reach 10 Torr or less, and subsequently, the space 34 is charged with a gas having a low thermal conductivity. The charging pressure is set at approximately atmospheric pressure at a temperature between about 30° to 40° C. Then, the connecting portion is moved upward by driving the air cylinder 22; an adhesive agent is injected into the opening 32b, for charging gas, of the double-walled container 31a, with which the gas charging has been completed, and to the surface of the recess in the upper portion of the opening; and a sealing plate 38 is inserted in the recess and bonded thereto; whereby the opening 32b for charging gas is sealed and a thermally insulated container 31 is produced.

This embodiment, in which the opening 32b for charging gas is provided in the flange portion 32a of the inner casing 32, is effective in such a case where the double-walled container 31a is with a structure such that it is unstable when placed upside down on the mounting block 11, for example, in the case when the mouth portion is narrow in comparison with the bottom portion, and thus the double-walled container may easily topple over.

Figure 6:
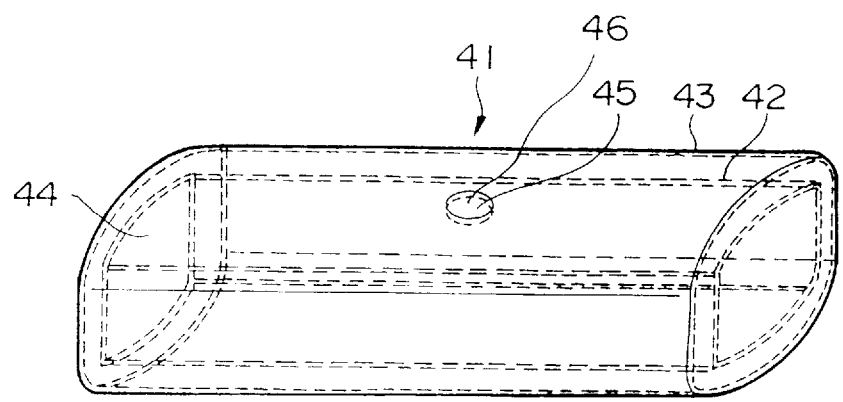
FIG. 6 is a front sectional view showing the third embodiment of a thermally insulated container of the present invention.

FIG. 6 shows the third embodiment of a thermally insulated container of the present invention. This thermilly insulated container 41 is made by charging and enclosing a gas, having a low thermal conductivity, with a space of a double-walled container in which an inner casing 42, which has the shape of a bottomed cylinder with a cross section in the shape of an ellipse or with a cross section in a shape such that two ends of a circle or an ellipse are cut off, and an outer casing 43 which is slightly larger than the inner casing 42, and which has nearly the same shape as that of the inner casing 42, are joined; the thermally insulated container 41 has a structure in which an opening 45 for charging gas is provided in a lateral portion of the outer casing 43, and the top portion of the opening 45 for charging gas is sealed with a sealing plate 46 which is bonded thereto.

As in this thermally insulated container 41, in the case when a thermally insulated container 41 is produced in which a cross section of an outer casing 43 is in the shape of an ellipse or the like, and in which an opening 45 for charging gas is provided in the lateral portion of the outer casing 43, by using a mounting block for exclusive use which is capable of retaining the double-walled container in a state that the mouth of the double-walled container faces laterally, and the opening 45 for charging gas faces upward, the thermally insulated container 41 is produced in a manner similar to the production processes in the first and second embodiments.

This embodiment is effective in a case in which the cross section of the outer casing 43 is in a shape, such as an ellipse, which is unstable when placed upside down or upright, and in the case when the opening for charging gas cannot be provided in the upper portion or the bottom portion of the double-walled container.

(Production Example)

In a manner similar to that of the first embodiment of the present invention, an inner casing 2 having a flange portion at the mouth portion, and an outer casing 3 which was slightly larger than the inner casing 2, and which had nearly the same shape as that of the inner casing 2, were prepared by an injection molding method using an ABS resin. In the bottom portion of the outer casing 3, an opening 3b, for charging gas, having a diameter of 1 mm was provided. Next, a copper plating layer with the thickness of approximately 10 μm was formed on each of the outer surface of the inner casing 2 and the inner surface of the outer casing 3 by means of electroplating.

Subsequently, a double-walled container was prepared by welding with ultrasonic waves the flange portion 2a of the inner casing 2 and the flange portion 3a of the outer casing 3. The thickness of the space 4 in the double-walled container was arranged to be approximately 5 mm.

Then, the double-walled container 1a was mounted upside down on the mounting block 11 of the production apparatus which was constructed in a manner similar to that shown in FIG. 2, the air cylinder 22 was driven downward, the bell jar 9 was fitted at the bottom portion of the outer casing 3, and the opening 3b for charging gas and the charging-evacuating tube 14 were connected. Then the lid 13 of the thermostatic chamber 12 was closed, and the space 4 was discharged to 10 Torr while the inside of the thermostatic chamber 12 was heated at approximately 35° C. Next, the space 4 was charged with xenon gas to atmospheric pressure, and after retention of approximately 1 minute, the bell jar 9 was raised, and immediately thereafter, a cyanoacrylic instantaneous adhesive agent was injected into the opening 3b for charging gas so as to seal it, and was applied to the periphery of the opening 3b for charging gas. Then, a sealing plate 8 made of a heat-resistant ABS resin was joined thereto to form a sealed portion 25.

The thermally insulated container 1 produced accordingly, which was made of a synthetic resin, and which was charged with xenon gas, possessed an excellent effective-volume ratio, required a low production cost, and could maintain thermal insulation performance for a long period.

As explained in the above, the thermally insulated container of the present invention possesses excellent thermal insulation performance, and can maintain the thermal insulation performance for a long period. In addition, since a small opening for charging gas having the diameter of 0.1 to 3 mm is sealed with an adhesive agent having a high gas-tightness, the sealed portion is highly reliable. Moreover, in the case when a sealing plate is bonded to the top of a sealed portion, the reliability of the sealed portion can be further enhanced, and the mechanical strength and the durability can be improved.

Moreover, according to the production process of the present invention, a thermally insulated container can be easily produced at low cost.

We claim:

1. A process for producing a thermally insulated container comprising the steps of a) preparing a double-walled container by arranging an inner casing in an outer casing so as to maintain a space therebetween, and by joining said inner casing and said outer casing into an integral body, a wall of either of said inner casing and said outer casing being provided with an opening for charging gas; then b) placing said double-walled container in a thermostatic chamber, connecting to said opening for charging gas a charging-evacuating tube which is switchably disposed to a vacuum evacuation apparatus and to a source of a gas having a low thermal conductivity, subjecting said space between said inner casing and said outer casing to vacuum evacuation, and thereafter introducing a gas having a low thermal conductivity; and then c) sealing said opening for charging gas.

2. A process for producing a thermally insulated container according to claim 1, wherein said opening for charging gas has a diameter of 0.1 to 3 mm.

3. A process for producing a thermally insulated container according to claim 1, wherein the pressure in said space during said vacuum evacuation is 10 Torr or less.

4. A process for producing a thermally insulated container according to claim 1, wherein said gas having a low thermal conductivity is introduced into said space at approximately atmospheric pressure.

5. A process for producing a thermally insulated container according to claim 1, wherein said gas having a low thermal conductivity is at least one gas selected from the group consisting of xenon, krypton, and argon.

6. A process for producing a thermally insulated container according to claim 1, wherein said sealing of said opening for charging gas is carried out using an adhesive agent.

7. A process for producing a thermally insulated container according to claim 6, wherein said adhesive agent is a cyanoacrylic adhesive agent.

8. A process for producing a thermally insulated container according to claim 1, wherein said sealing of said opening for charging gas is carried out by bonding a sealing plate with an adhesive agent.

9. A process for producing a thermally insulated container according to claim 8, wherein said adhesive agent is a cyanoacrylic adhesive agent.

10. A process for producing a thermally insulated container according to claim 1, wherein at least said outer casing, among said inner casing and said outer casing, is made of a synthetic resin material.

11. A process for producing a thermally insulated container as in claim 1 wherein said inner and outer casings are each of a material that remains rigid during both the steps of vacuum evacuation and introduction of gas into said space.

12. A process for producing a thermally insulated container as in claim 1 wherein said container has an open top into the inner casing during both the steps of vacuum evacuation and introduction of gas into said space.

* * * * *